United States Patent
Tian et al.

(10) Patent No.: US 12,229,519 B2
(45) Date of Patent: Feb. 18, 2025

(54) METHOD AND APPARATUS FOR GENERATING DIALOGUE STATE

(71) Applicant: BEIJING BAIDU NETCOM SCIENCE TECHNOLOGY CO., LTD., Beijing (CN)

(72) Inventors: Xin Tian, Beijing (CN); Liankai Huang, Beijing (CN); Yingzhan Lin, Beijing (CN); Siqi Bao, Beijing (CN); Huang He, Beijing (CN); Fan Wang, Beijing (CN); Shuqi Sun, Beijing (CN); Shiwei Huang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 317 days.

(21) Appl. No.: 17/806,086

(22) Filed: Jun. 9, 2022

(65) Prior Publication Data

US 2022/0300717 A1    Sep. 22, 2022

(30) Foreign Application Priority Data

Jun. 30, 2021 (CN) .......................... 202110738781.4

(51) Int. Cl.
G06F 40/35 (2020.01)
(52) U.S. Cl.
CPC .................... G06F 40/35 (2020.01)
(58) Field of Classification Search
CPC ........... G06F 40/35; G06F 40/30; G06F 40/56
USPC ........................................................ 704/9
See application file for complete search history.

(56) References Cited

U.S. PATENT DOCUMENTS

| | | | | |
|---|---|---|---|---|
| 2017/0337036 A1* | 11/2017 | Fujii | ...................... | G06F 3/0482 |
| 2020/0272791 A1* | 8/2020 | Jonnalagadda | .......... | G06N 5/04 |
| 2020/0320988 A1* | 10/2020 | Rastogi | ................... | G10L 15/18 |
| 2021/0089588 A1* | 3/2021 | Le | ............................ | G06N 3/04 |
| 2021/0174023 A1* | 6/2021 | Gao | ....................... | G06F 40/35 |

(Continued)

FOREIGN PATENT DOCUMENTS

| | | | |
|---|---|---|---|
| CN | 109582767 A | | 4/2019 |
| CN | 110609618 A | | 12/2019 |

(Continued)

OTHER PUBLICATIONS

Office Action issued in corresponding JP Application No. 2022-035290 with English translation dated Jan. 10, 2023 (8 pages).

(Continued)

*Primary Examiner* — Richemond Dorvil
*Assistant Examiner* — Rodrigo A Chavez
(74) *Attorney, Agent, or Firm* — Osha Bergman Watanabe & Burton LLP

(57) ABSTRACT

A method for generating a dialogue state includes: acquiring a target dialogue state of a previous round of dialogue and dialogue information of a current round of dialogue; generating an initial dialogue state of the current round of dialogue according to the target dialogue state of the previous round of dialogue and the dialogue information of the current round of dialogue; and generating a target dialogue state of the current round of dialogue according to the initial dialogue state of the current round of dialogue and the dialogue information of the current round of dialogue.

5 Claims, 6 Drawing Sheets

(56) References Cited

U.S. PATENT DOCUMENTS

| | | | |
|---|---|---|---|
| 2021/0201144 A1* | 7/2021 | Jonnalagadda | G06N 3/08 |
| 2021/0217408 A1* | 7/2021 | Hakkani-Tur | G06N 3/02 |
| 2021/0383212 A1* | 12/2021 | Ramachandran | G06N 3/084 |
| 2022/0300717 A1* | 9/2022 | Tian | G06F 40/35 |
| 2022/0382995 A1* | 12/2022 | Lee | G06F 16/3343 |

FOREIGN PATENT DOCUMENTS

| | | |
|---|---|---|
| CN | 112579758 A | 3/2021 |
| CN | 112632254 A | 4/2021 |
| CN | 112650844 A | 4/2021 |
| CN | 112990292 A | 6/2021 |

OTHER PUBLICATIONS

Office Action issued in Chinese Application No. 202110738781.4, mailed on Jun. 5, 2023 (16 pages).

\* cited by examiner

METHOD AND APPARATUS FOR GENERATING DIALOGUE STATE

CROSS REFERENCE TO RELATED APPLICATIONS

This application is based on and claims priority to Chinese Patent Application No. 202110738781.4, filed on Jun. 30, 2021, the entire contents of which are incorporated herein for all purposes.

TECHNICAL FIELD

The disclosure relates to natural language processing (NLP) and deep learning (DL) in the field of artificial intelligence (AI) technologies, and particularly to a method and an apparatus for generating a dialogue state, an electronic device and a storage medium.

BACKGROUND

Dialogue State Tracking (DST) is an important part of a task-oriented dialogue system. In the DST, a target word slot of a user is extracted from each round of dialogue, and further a request of the user is performed through a subsequent process, which is widely applied to intelligent customer service, intelligent travel, intelligent office, etc.

In the related art, an effect of the DST is poor.

SUMMARY

According to a first aspect, a method for generating a dialogue state is provided and includes: acquiring a target dialogue state of a previous round of dialogue and dialogue information of a current round of dialogue; generating an initial dialogue state of the current round of dialogue according to the target dialogue state of the previous round of dialogue and the dialogue information of the current round of dialogue; and generating a target dialogue state of the current round of dialogue according to the initial dialogue state of the current round of dialogue and the dialogue information of the current round of dialogue.

According to a second aspect, an electronic device is provided, and includes: at least one processor; and a memory communicatively coupled to at least one processor. The memory is stored with instructions executable by the at least one processor. When the instructions are executed by the at least one processor, the at least one processor is enabled to perform the method for generating a dialogue state as described in the first aspect of the disclosure.

According to a third aspect, a non-transitory computer-readable storage medium stored with computer instructions is provided. The computer instructions are configured to enable a computer to perform the method for generating a dialogue state as described in the first aspect of the disclosure.

It should be understood that, the content described in this part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The example embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made on the embodiments described herein without departing from the scope and spirit of the present disclosure. Similarly, for clarity and conciseness, descriptions of well-known functions and structures are omitted in the following descriptions.

Artificial Intelligence (AI) is a new science of technology that studies and develops theories, methods, technologies and application systems configured to simulate, extend and expand human intelligence. At present, AI technology is characterized by high automation, high accuracy and low cost, and is widely applied.

Natural Language Processing (NLP) is a science that studies computer systems, especially software systems therein, that can effectively achieve natural language communication, and is an important direction in the field of computer science and artificial intelligence.

Deep Learning (DL) is a new research direction in the field of machine learning (ML) that learns inherent law and representation hierarchy of sample data, and information acquired in the learning process is of great help in interpretation of data such as words, images and sound. The final goal of DL is that the machine can have analytic learning ability like humans, and can recognize data such as words, images, sound, etc. In terms of specific research contents, it mainly includes a neural network system based on a convolution operation, that is, a convolutional neural network; an auto-encoder neural network based on multi-layer neurons; and a deep belief network which performs pre-training in a manner of a multi-layer auto-encoder neural network, and further optimizes neural network weights in combination with discrimination information. DL makes many achievements in search technology, data mining, machine learning, machine translation, natural language processing, multimedia learning, voice, recommendation, personalization technology and other related fields. DL enables a machine to imitate human activities such as audiovisual and thinking, which solves many complex pattern recognition difficulties, so that artificial intelligence-related technology makes great progress.

A method and an apparatus for generating a dialogue state, an electronic device and a storage medium are described in combination with figures in embodiments of the disclosure.

Figure 1:
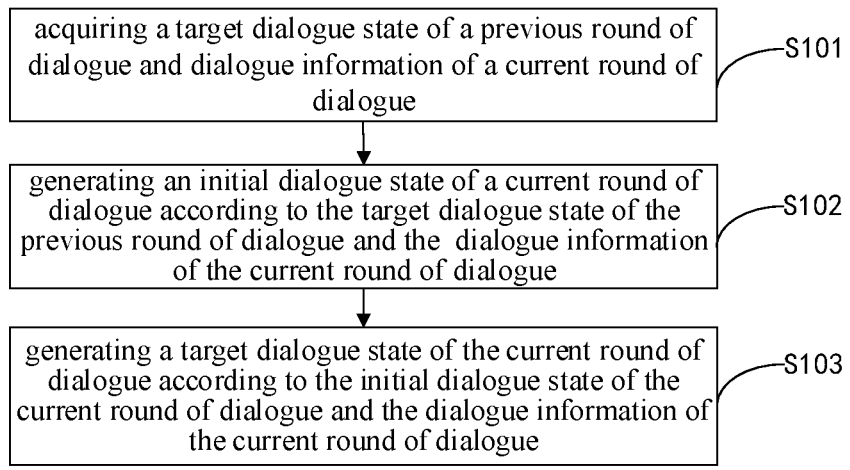
FIG. 1 is a flowchart of a method for generating a dialogue state according to a first embodiment of the present disclosure.

FIG. 1 is a flowchart of a method for generating a dialogue state according to a first embodiment of the present disclosure.

As illustrated in FIG. 1, the method for generating a dialogue state in embodiments of the present disclosure may specifically include the following blocks.

At S101, a target dialogue state of a previous round of dialogue and dialogue information of a current round of dialogue are acquired.

Specifically, an execution subject of the method for generating a dialogue state in embodiments of the present disclosure may be an apparatus for generating a dialogue state in embodiments of the present disclosure, and the apparatus for generating a dialogue state may be a hardware device with a data information processing ability and/or a software necessary to drive operation of the hardware device. Optionally, the execution subject may include a workstation, a server, a computer, a user terminal and other devices. The user terminal includes but is not limited to a mobile phone, a computer, a smart voice interaction device, a smart appliance, a vehicle-mounted terminal, etc.

In embodiments of the disclosure, a final dialogue state corresponding to a previous round of dialogue information in the dialogue to be recognized is acquired, that is, the target dialogue state of the previous round of dialogue is acquired, and the dialogue information of the current round of dialogue in the dialogue to be recognized is also acquired. The target dialogue state of the previous round of dialogue may be represented as a spliced sequence of a word slot and a value, and the target dialogue state of the previous round of dialogue may be obtained by the method described below in embodiments of the disclosure.

The dialogue to be recognized may be acquired by means of recording, network transmission, etc. For example, when the dialogue to be recognized is acquired by means of recording, a device may have an apparatus for collecting a dialogue, which may be a microphone, a microphone array, etc. Alternatively, when the dialogue to be recognized is acquired by means of network transmission, a device may have an internet apparatus, via which the device may perform network transmission with other devices or servers. It could be understood that, the dialogue to be recognized may be in the form of an audio, a text, etc., which will not be limited here.

At S102, an initial dialogue state of the current round of dialogue is generated according to the target dialogue state of the previous round of dialogue and the dialogue information of the current round of dialogue.

Specifically, the target dialogue state of the previous round of dialogue and the dialogue information of the current round of dialogue acquired at S101 are further spliced, and based on the spliced sequence, a rough dialogue state corresponding to the current round of dialogue information is generated, that is, the initial dialogue state of the current round of dialogue.

At S103, a target dialogue state of a current round of dialogue is generated according to the initial dialogue state of the current round of dialogue and the dialogue information of the current round of dialogue.

Specifically, the initial dialogue state of the current round of dialogue generated at block S102 is spliced with the dialogue information of the current round of dialogue, and based on the spliced sequence, a final dialogue state corresponding to the current round of dialogue information is generated, that is, the target dialogue state of the current round of dialogue.

In summary, in the method for generating a dialogue state according to embodiments of the disclosure, the target dialogue state of the previous round of dialogue and dialogue information of the current round of dialogue are acquired, the initial dialogue state of the current round of dialogue is generated according to the target dialogue state of the previous round of dialogue and the dialogue information of the current round of dialogue, and the target dialogue state of the current round of dialogue is generated according to the initial dialogue state of the current round of dialogue and the dialogue information of the current round of dialogue. The method for generating a dialogue state in the disclosure performs dialogue state sequence generation in two stages, so that a dialogue state generated in a first stage may be retouched and modified in a second stage, which learn information not learned in the first stage and correct the wrong dialogue state generated at the first time, thereby improving an effect of dialogue state tracking (DST).

Figure 2:
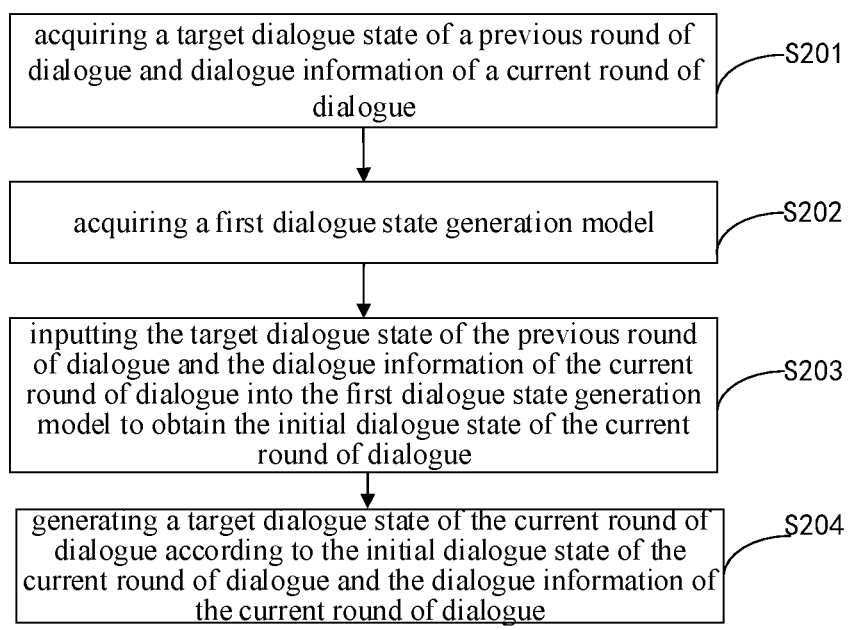
FIG. 2 is a flowchart of a method for generating a dialogue state according to a second embodiment of the present disclosure.

FIG. 2 is a flowchart of a method for generating a dialogue state according to a second embodiment of the present disclosure.

As illustrated in FIG. 2, on the basis of the embodiment as illustrated in FIG. 1, the method for generating a dialogue state in the embodiment of the disclosure may specifically include the following blocks.

At S201, a target dialogue state of a previous round of dialogue and dialogue information of a current round of dialogue are acquired.

Specifically, block S201 in the embodiment is the same as block S101 in the above embodiment, which will not be repeated here.

Block S102 of "an initial dialogue state of a current round of dialogue is generated according to the target dialogue state of the previous round of dialogue and the dialogue information of the current round of dialogue" in the above embodiment may specifically include the following blocks S202-S203.

At S202, a first dialogue state generation model is acquired.

Specifically, the first dialogue state generation model may be an encoder-decoder pre-training model, for example, a Transformer encoder-decoder pre-training model, which is not limited in the embodiment of the disclosure.

At S203, the target dialogue state of the previous round of dialogue and the dialogue information of the current round of dialogue are inputted into the first dialogue state generation model to obtain the initial dialogue state of the current round of dialogue.

Specifically, the target dialogue state of the previous round of dialogue acquired at S201 represented as a spliced sequence of a word slot and a value is further spliced with the dialogue information of the current round of dialogue, and the spliced sequence is inputted to the first dialogue state generation model acquired at block S202, and the encoder in the first dialogue state generation model performs bidirectional encoding on inputted information to generate the initial dialogue state of the current round of dialogue.

At S204, a target dialogue state of the current round of dialogue is generated according to the initial dialogue state of the current round of dialogue and the dialogue information of the current round of dialogue.

Specifically, block S204 in the embodiment is the same as block S103 in the above embodiment, which will not be repeated here.

Figure 3:
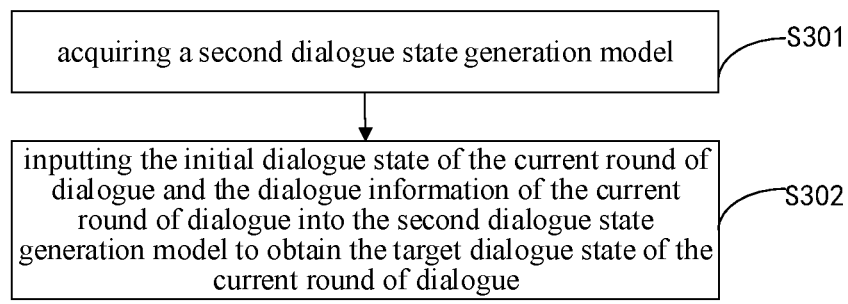
FIG. 3 is a flowchart of a method for generating a dialogue state according to a third embodiment of the present disclosure.

Further, as illustrated in FIG. 3, on the basis of the embodiment as illustrated in FIG. 2, block S103 of "a target dialogue state of the current round of dialogue is generated according to the initial dialogue state of the current round of dialogue and the dialogue information of the current round of dialogue" may specifically include the following blocks.

At S301, a second dialogue state generation model is acquired.

Specifically, the second dialogue state generation model may adopt the same model structure with the first dialogue state generation model, that is, the second dialogue state generation model may be an encoder-decoder pre-training model, for example, a preorder encoder-decoder pre-training model, which is not limited in the embodiment of the disclosure. Further, model parameters of the first dialogue state generation model may be the same as model parameters of the second dialogue state generation model, so that two stages may gain each other, further to make the final model ability stronger.

At S302, the initial dialogue state of the current round of dialogue and the dialogue information of the current round of dialogue are inputted into the second dialogue state generation model to obtain the target dialogue state of the current round of dialogue.

Specifically, the initial dialogue state of the current round of dialogue acquired at S203 is further spliced with the dialogue information of the current round of dialogue, and the spliced sequence is inputted into the second dialogue state generation model acquired at block S301. The encoder in the second dialogue state generation model performs bidirectional encoding on the inputted information, and the decoder generates the target dialogue state of the current round of dialogue.

In summary, in the method for generating a dialogue state according to embodiments of the disclosure, the target dialogue state of the previous round of dialogue and dialogue information of the current round of dialogue are acquired, the initial dialogue state of the current round of dialogue is generated according to the target dialogue state of the previous round of dialogue and the dialogue information of the current round of dialogue, and the target dialogue state of the current round of dialogue is generated according to the initial dialogue state of the current round of dialogue and the dialogue information of the current round of dialogue. The method for generating a dialogue state of the disclosure performs dialogue state sequence generation in two stages, by inputting the target dialogue state of the previous round of dialogue and the dialogue information of the current round of dialogue into the first dialogue state generation model to obtain the initial dialogue state of the current round of dialogue, and then inputting the initial dialogue state of the current round of dialogue and the dialogue information of the current round of dialogue into the second dialogue state generation model to obtain the target dialogue state of the current round of dialogue, so that a dialogue state generated in a first stage may be retouched and modified in a second stage, which learn information not learned in the first stage and correct the wrong dialogue state generated at the first time, thereby improving an effect of dialogue state tracking (DST). Moreover, the two stages share model parameters, so that two stages can gain each other, further to make the final model ability stronger.

In order to clarify the method for generating a dialogue state in the embodiment of the disclosure, illustration is given below in combination with FIG. 4-FIG. 5.

Figure 4:
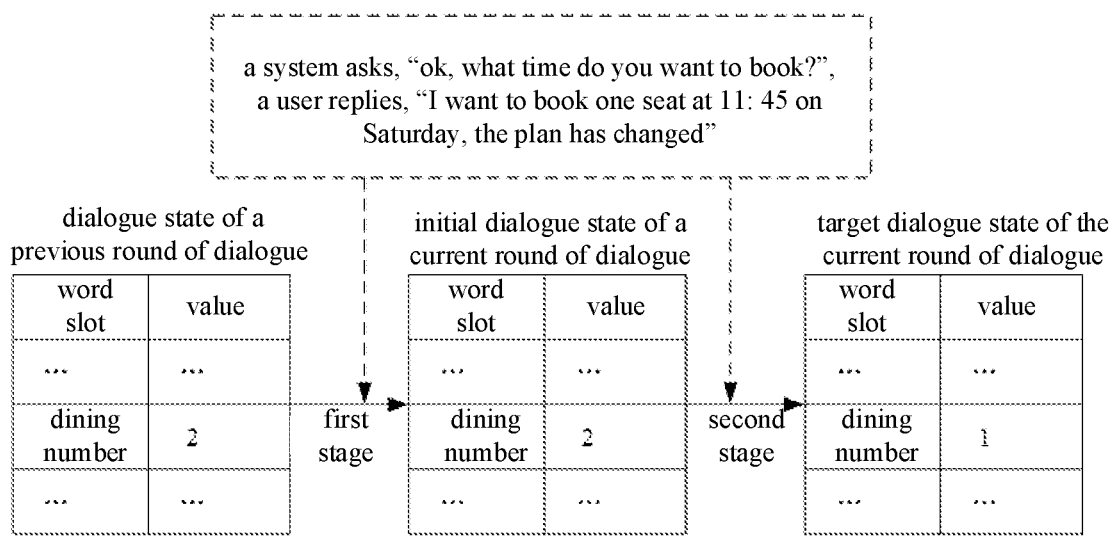
FIG. 4 is a schematic diagram illustrating a principle of a method for generating a dialogue state according to embodiments of the present disclosure.

FIG. 4 is a schematic diagram illustrating a principle of a method for generating a dialogue state according to embodiments of the present disclosure. As illustrated in FIG. 4, in the first stage, the target dialogue state of the previous round of dialogue is acquired and is represented as a spliced sequence of a word slot and a value, for example, the word slot is a dining number, and the corresponding value is 2. The dialogue information of the current round of dialogue is acquired, for example, a system asks "ok, what time do you want to book?", and a user replies, "I want to book one seat at 11:45 on Saturday, the plan has changed". Based on the target dialogue state of the previous round of dialogue and the dialogue information of the current round of dialogue, the initial dialogue state of the current round of dialogue is generated, and is represented as a spliced sequence of a word slot and a value, for example, the word slot is a dining number, and the corresponding value is 2. In the second stage, the target dialogue state of the current round of dialogue is generated based on the initial dialogue state of the current round of dialogue and the dialogue information of the current round of dialogue, and is represented as a spliced sequence of a word slot and a value, for example, the word slot is the dining number, and the corresponding value is 1. It can be seen that by means of dialogue state sequence generations in two stages, the wrong dialogue state "the dining number is 2" is corrected to "the dining number is 1", thereby enhancing a final DST effect.

Figure 5:
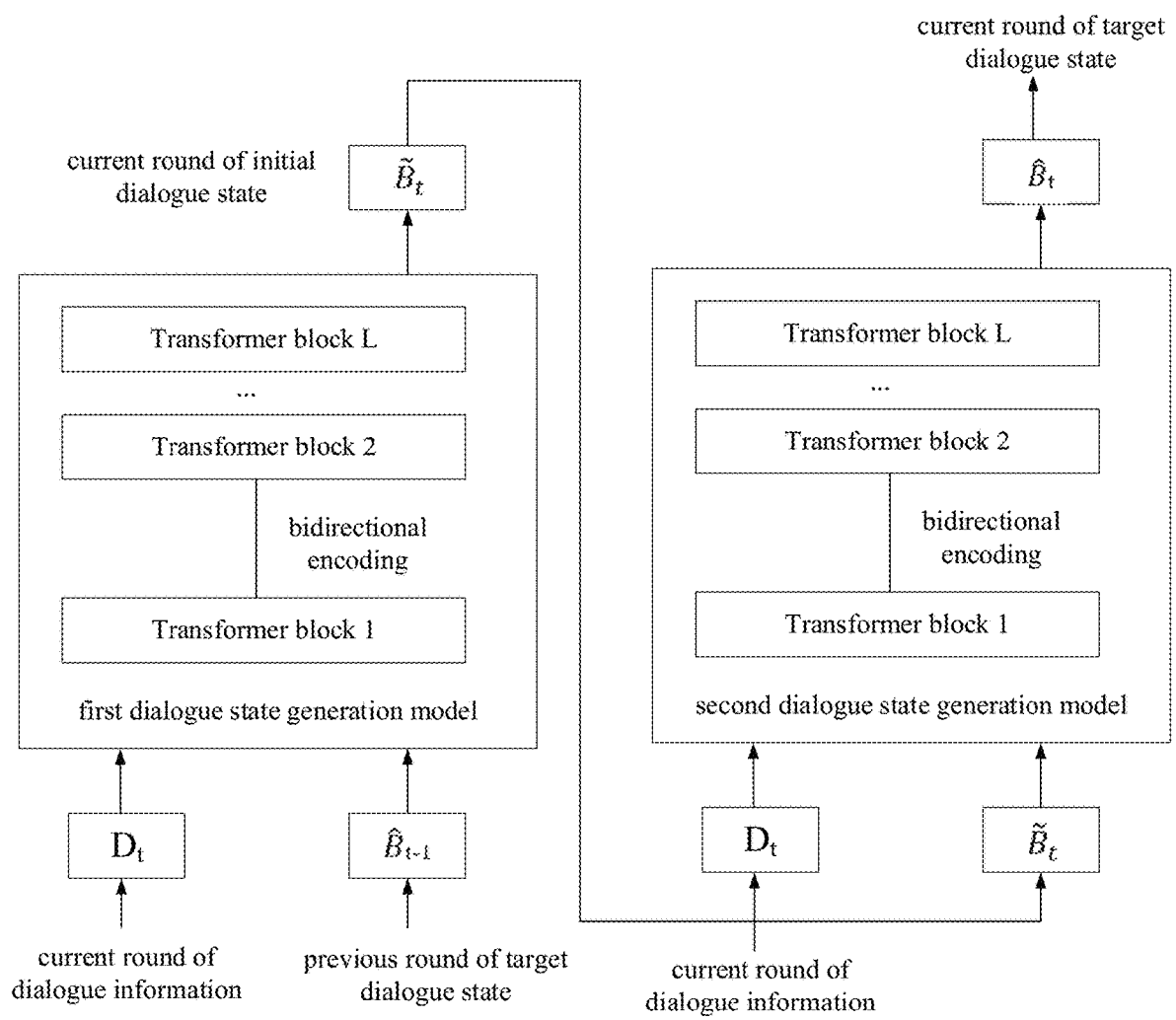
FIG. 5 is another schematic diagram illustrating a principle of a method for generating a dialogue state according to embodiments of the present disclosure.

FIG. 5 is another schematic diagram illustrating a principle of a method for generating a dialogue state according to embodiments of the present disclosure. As illustrated in FIG. 5, the dialogue information $D_t$ of the current round of dialogue and the target dialogue state $\hat{B}_{t-1}$ of the previous round of dialogue are inputted into the first dialogue state generation model, and bidirectional encoding and decoding is performed by L transformer blocks to generate the initial dialogue state $\tilde{B}_t$ of the current round of dialogue, and the initial dialogue state $\tilde{B}_t$ of the current round of dialogue and the dialogue information $D_t$ of the current round of dialogue are inputted into the second dialogue state generation model, and bidirectional encoding and decoding is performed by the L transformer blocks to generate the target dialogue state $\hat{B}_t$ of the current round of dialogue.

Figure 6:
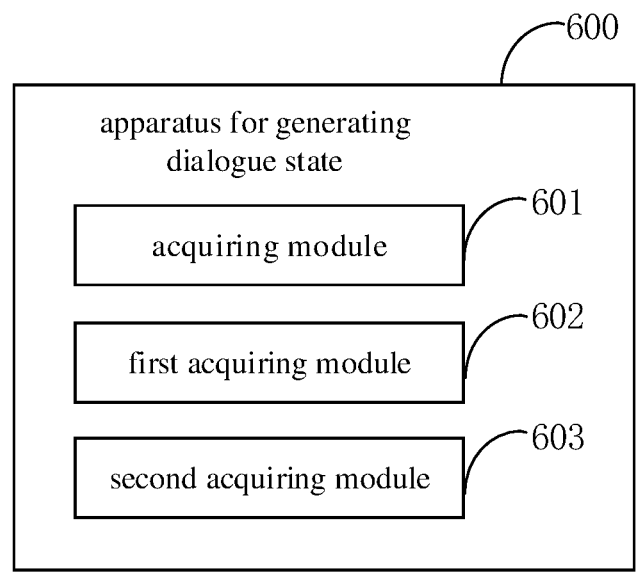
FIG. 6 is a block diagram of an apparatus for generating a dialogue state according to a first embodiment of the present disclosure.

FIG. 6 is a block diagram of an apparatus for generating a dialogue state according to a first embodiment of the present disclosure.

As illustrated in FIG. 6, the apparatus 600 for generating a dialogue state in the embodiment of the disclosure includes an acquiring module 601, a first generating module 602 and a second generating module 603.

The acquiring module 601 is configured to acquire a target dialogue state of a previous round of dialogue and dialogue information of a current round of dialogue.

The first generating module 602 is configured to generate an initial dialogue state of a current round of dialogue according to the target dialogue state of the previous round of dialogue and the dialogue information of the current round of dialogue.

The second generating module 603 is configured to generate a target dialogue state of the current round of dialogue according to the initial dialogue state of the current round of dialogue and the dialogue information of the current round of dialogue.

It should be noted that the foregoing explanation of embodiments of the method for generating a dialogue state is also applied to the apparatus for generating a dialogue state in the embodiment, which will not be repeated here.

In summary, in the apparatus for generating a dialogue state according to embodiments of the disclosure, the target dialogue state of the previous round of dialogue and dialogue information of the current round of dialogue are acquired, the initial dialogue state of the current round of dialogue is generated according to the target dialogue state of the previous round of dialogue and the dialogue information of the current round of dialogue, and the target dialogue state of the current round of dialogue is generated according to the initial dialogue state of the current round of dialogue and the dialogue information of the current round of dialogue. The apparatus for generating a dialogue state in the disclosure performs dialogue state sequence generation in two stages, so that a dialogue state generated in a first stage may be retouched and modified in a second stage, which learn information not learned in the first stage and correct the wrong dialogue state generated at the first time, thereby improving an effect of dialogue state tracking (DST).

Figure 7:
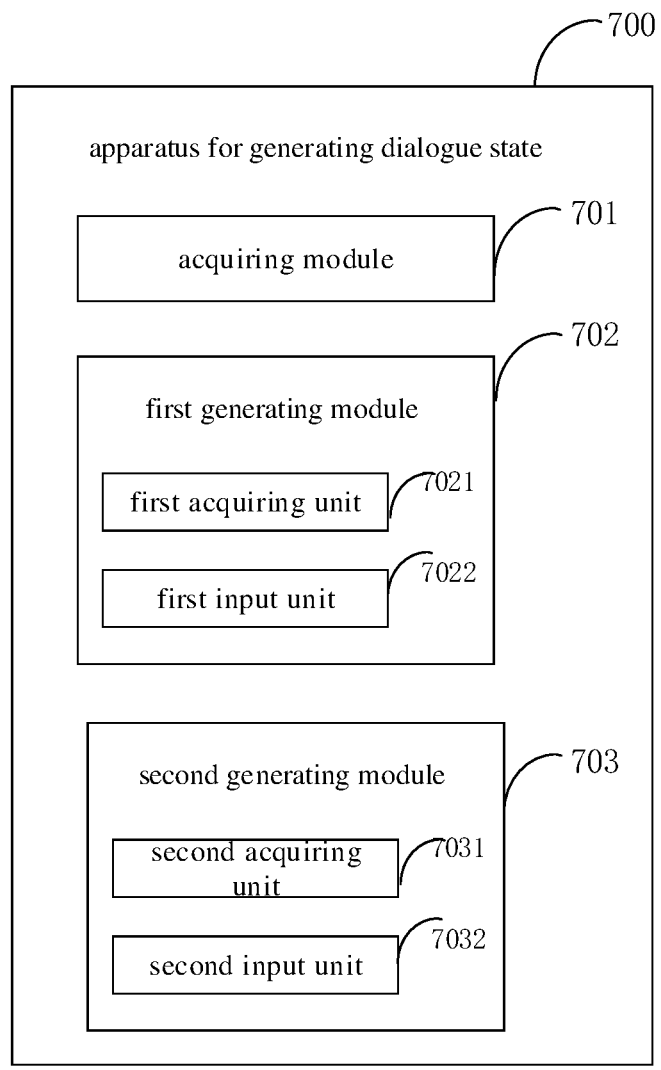
FIG. 7 is a block diagram of an apparatus for generating a dialogue state according to a second embodiment of the present disclosure.

FIG. 7 is a block diagram of an apparatus for generating a dialogue state according to a second embodiment of the present disclosure.

As illustrated in FIG. 7, the apparatus 700 for generating a dialogue state in the embodiment of the disclosure includes an acquiring module 701, a first generating module 702 and a second generating module 703.

The acquiring module 701 has the same structure and function with the acquiring module 601 in the above embodiment, and the first generating module 702 has the same structure and function with the first generating module 602 in the above embodiment, and the second generating module 703 has the same structure and function with the second generating module 603 in the above embodiment.

Further, the first generating module 702 may specifically include: a first acquiring unit 7021 and a first input unit 7022. The first acquiring unit 7021 is configured to acquire a first dialogue state generation model. The first input unit 7022 is configured to input the target dialogue state of the previous round of dialogue and the dialogue information of the current round of dialogue into the first dialogue state generation model to obtain the initial dialogue state of the current round of dialogue.

Further, the second generating module 703 may specifically include a second acquiring unit 7031 and a second input unit 7032. The second acquiring unit 7021 is configured to acquire a second dialogue state generation model. The second input unit 7022 is configured to input the initial dialogue state of the current round of dialogue and the dialogue information of the current round of dialogue into the second dialogue state generation model to obtain the target dialogue state of the current round of dialogue.

The first dialogue state generation model and the second dialogue state generation model may be encoder-decoder pre-training models.

Alternatively, the first dialogue state generation model and the second dialogue state generation model may be Transformer encoder-decoder pre-training models.

Model parameters of first dialogue state generation model are the same as model parameters of the second dialogue state generation model.

In summary, in the apparatus for generating a dialogue state according to embodiments of the disclosure, the target dialogue state of the previous round of dialogue and dialogue information of the current round of dialogue are acquired, the initial dialogue state of the current round of dialogue is generated according to the target dialogue state of the previous round of dialogue and the dialogue information of the current round of dialogue, and the target dialogue state of the current round of dialogue is generated according to the initial dialogue state of the current round of dialogue and the dialogue information of the current round of dialogue. The apparatus for generating a dialogue state of the disclosure performs dialogue state sequence generation in two stages, by inputting the target dialogue state of the previous round of dialogue and the dialogue information of the current round of dialogue into the first dialogue state generation model to obtain the initial dialogue state of the current round of dialogue, and then inputting the initial dialogue state of the current round of dialogue and the dialogue information of the current round of dialogue into the second dialogue state generation model to obtain the target dialogue state of the current round of dialogue, so that a dialogue state generated in a first stage may be retouched and modified in a second stage, which learn information not learned in the first stage and correct the wrong dialogue state generated at the first time, thereby improving an effect of dialogue state tracking (DST). Moreover, the two stages share model parameters, so that two stages can gain each other, further to make the final model ability stronger.

According to embodiments of the disclosure, the disclosure further provides an electronic device, a readable storage medium and a computer program product.

Figure 8:
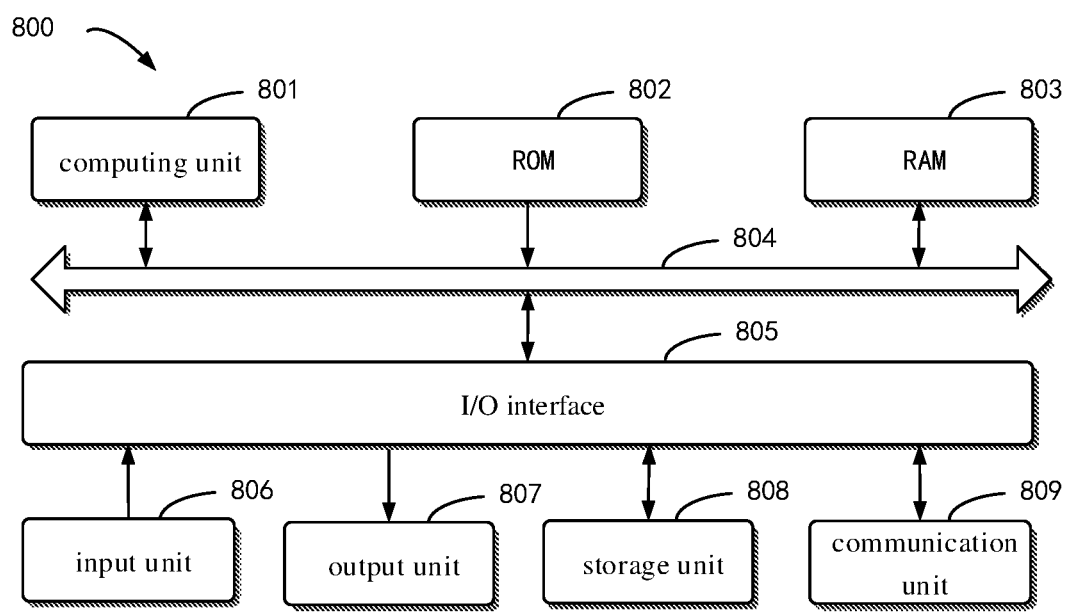
FIG. 8 is a block diagram of an electronic device configured to implement a method for generating a dialogue state in embodiments of the disclosure.

FIG. 8 illustrates a schematic block diagram of an example electronic device 800 configured to implement embodiments of the disclosure. The electronic device is intended to represent various types of digital computers, such as laptop computers, desktop computers, workstations, personal digital assistants, servers, blade servers, mainframe computers, and other suitable computers. The electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 8, the electronic device 800 includes a computing unit 801, which may execute various appropriate actions and processing based on a computer program stored in a read-only memory (ROM) 802 or a computer program loaded into a random access memory (RAM) 803 from a storage unit 808. In the RAM 803, various programs and data required for operation of the electronic device 800 may also be stored. A computing unit 801, a ROM 802 and a RAM 803 may be connected to each other by a bus 804. An input/output (I/O) interface 805 is also connected to a bus 804.

A plurality of components in the electronic device 800 are connected to an I/O interface 805, and includes: an input unit 806, for example, a keyboard, a mouse, etc; an output unit 809, for example various types of displays, speakers; a memory unit 808, for example a magnetic disk, an optical disk; and a communication unit 809, for example, a network card, a modem, a wireless transceiver. A communication unit 809 allows the electronic device 800 to exchange information/data through a computer network such as internet and/or various types of telecommunication networks and other devices.

A computing unit 801 may be various types of general and/or dedicated processing components with processing and computing ability. Some examples of a computing unit 801 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. A computing unit 801 performs various methods and processing as described above, for example, methods for generating a dialogue state as illustrated in FIG. 1 to FIG. 5. For example, in some embodiments, a method for generating a dialogue state may be further implemented as a computer software program, which is physically contained in a machine readable medium, such as a storage unit 808. In some embodiments, some or all of the computer programs may be loaded and/or mounted on the electronic device 800 via a ROM 802 and/or a communication unit 809. When the computer program is loaded on a RAM 803 and executed by a computing unit 801, one or more blocks in the above method for generating a dialogue state may be performed. Alternatively, in other embodiments, a computing unit 801 may be configured to execute a method for generating a dialogue state in other appropriate ways (for example, by virtue of a firmware).

Various implementation modes of the systems and technologies described above may be implemented in a digital electronic circuit system, a field programmable gate array (FPGA), an application-specific integrated circuit (ASIC), an application specific standard product (ASSP), a system-on-chip (SOC) system, a complex programmable logic device, a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of a plurality of programming languages. The programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. A machine-readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with a user, the systems and technologies described here may be implemented on a computer, and the computer has: a display apparatus for displaying information to a user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relationship between the client and the server is generated by computer programs running on the corresponding computer and having a client-server relationship with each other. A server may be a cloud server, also known as a cloud computing server or a cloud host, is a host product in a cloud computing service system, to solve the shortcomings of large management difficulty and weak business expansibility existed in the conventional physical host and Virtual Private Server (VPS) service. A server further may be a server with a distributed system, or a server in combination with a blockchain.

According to an embodiment of the disclosure, a computer program product including a computer program is further provided in the disclosure, the computer program is configured to perform the method for generating a dialogue state as described in the above embodiment when performed by a processor.

It should be understood that, various forms of procedures shown above may be configured to reorder, add or delete blocks. For example, blocks described in the disclosure may be performed in parallel, sequentially, or in a different order, as long as the desired result of the technical solution disclosed in the present disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of the present disclosure.

What is claimed is:

1. A method for generating a dialogue state, performed by a terminal, comprising:
   acquiring a target dialogue state of a previous round of dialogue and dialogue information of a current round of dialogue;
   generating an initial dialogue state of the current round of dialogue according to the target dialogue state of the previous round of dialogue and the dialogue information of the current round of dialogue; wherein generating the initial dialogue state of the current round of dialogue according to the target dialogue state of the previous round of dialogue and the dialogue information of the current round of dialogue, comprises:
   acquiring a first dialogue state generation model; and
   obtaining the initial dialogue state of the current round of dialogue by inputting the target dialogue state of the previous round of dialogue and the dialogue information of the current round of dialogue into the first dialogue state generation model;
   generating a target dialogue state of the current round of dialogue according to the initial dialogue state of the current round of dialogue and the dialogue information of the current round of dialogue; wherein generating the target dialogue state of the current round of dialogue according to the initial dialogue state of the current round of dialogue and the dialogue information of the current round of dialogue, comprises:
   acquiring a second dialogue state generation model; and
   obtaining the target dialogue state of the current round of dialogue by inputting the initial dialogue state of the current round of dialogue and the dialogue information of the current round of dialogue into the second dialogue state generation model;
   wherein the first dialogue state generation model and the second dialogue state generation model are Transformer encoder-decoder pre-training models; and the first dialogue state generation model and the second dialogue state generation model comprise L transformer blocks respectively;
   wherein the dialogue information of the current round of dialogue and the target dialogue state of the previous round of dialogue are inputted into the first dialogue state generation model, and bidirectional encoding and decoding is performed by L transformer blocks to generate the initial dialogue state of the current round of dialogue, and the initial dialogue state of the current round of dialogue and the dialogue information of the current round of dialogue are inputted into the second dialogue state generation model, and bidirectional encoding and decoding is performed by the L transformer blocks to generate the target dialogue state of the current round of dialogue.

2. The method of claim 1, wherein model parameters of the first dialogue state generation model are the same as model parameters of the second dialogue state generation model.

3. An electronic device, comprising:
   at least one processor; and
   a memory communicatively connected to the at least one processor; wherein,
   the memory is stored with instructions executable by the at least one processor, and when the instructions are executed by the at least one processor, the at least one processor is configured to:
   acquire a target dialogue state of a previous round of dialogue and dialogue information of a current round of dialogue;
   generate an initial dialogue state of the current round of dialogue according to the target dialogue state of the previous round of dialogue and the dialogue information of the current round of dialogue; and
   generate a target dialogue state of the current round of dialogue according to the initial dialogue state of the current round of dialogue and the dialogue information of the current round of dialogue;
   wherein the at least one processor is further configured to:
   acquire a first dialogue state generation model; and obtain the initial dialogue state of the current round of dialogue by inputting the target dialogue state of the previous round of dialogue and the dialogue information of the current round of dialogue into the first dialogue state generation model;
   acquire a second dialogue state generation model; and obtain the target dialogue state of the current round of dialogue by inputting the initial dialogue state of the current round of dialogue and the dialogue information of the current round of dialogue into the second dialogue state generation model;
   wherein the first dialogue state generation model and the second dialogue state generation model are Transformer encoder-decoder pre-training models; and the first dialogue state generation model and the second dialogue state generation model are Transformer encoder-decoder pre-training models; and the first dialogue state generation model and the second dialogue state generation model comprise L transformer blocks respectively;
   wherein the dialogue information of the current round of dialogue and the target dialogue state of the previous round of dialogue are inputted into the first dialogue state generation model, and bidirectional encoding and decoding is performed by L transformer blocks to generate the initial dialogue state of the current round of dialogue, and the initial dialogue state of the current round of dialogue and the dialogue information of the current round of dialogue are inputted into the second dialogue state generation model, and bidirectional encoding and decoding is performed by the L transformer blocks to generate the target dialogue state of the current round of dialogue.

4. The electronic device of claim 3, wherein model parameters of the first dialogue state generation model are the same as model parameters of the second dialogue state generation model.

5. A non-transitory computer-readable storage medium stored with computer instructions, wherein, the computer instructions are configured to enable a computer to perform a method for generating a dialogue state, the method comprising:
   acquiring a target dialogue state of a previous round of dialogue and dialogue information of a current round of dialogue;
   generating an initial dialogue state of the current round of dialogue according to the target dialogue state of the previous round of dialogue and the dialogue information of the current round of dialogue; wherein generating the initial dialogue state of the current round of dialogue according to the target dialogue state of the previous round of dialogue and the dialogue information of the current round of dialogue, comprises:

acquiring a first dialogue state generation model; and obtaining the initial dialogue state of the current round of dialogue by inputting the target dialogue state of the previous round of dialogue and the dialogue information of the current round of dialogue into the first dialogue state generation model;

generating a target dialogue state of the current round of dialogue according to the initial dialogue state of the current round of dialogue and the dialogue information of the current round of dialogue; wherein generating the target dialogue state of the current round of dialogue according to the initial dialogue state of the current round of dialogue and the dialogue information of the current round of dialogue, comprises:

acquiring a second dialogue state generation model; and obtaining the target dialogue state of the current round of dialogue by inputting the initial dialogue state of the current round of dialogue and the dialogue information of the current round of dialogue into the second dialogue state generation model;

wherein the first dialogue state generation model and the second dialogue state generation model are Transformer encoder-decoder pre-training models; and the first dialogue state generation model and the second dialogue state generation model comprise L transformer blocks respectively;

wherein the dialogue information of the current round of dialogue and the target dialogue state of the previous round of dialogue are inputted into the first dialogue state generation model, and bidirectional encoding and decoding is performed by L transformer blocks to generate the initial dialogue state of the current round of dialogue, and the initial dialogue state of the current round of dialogue and the dialogue information of the current round of dialogue are inputted into the second dialogue state generation model, and bidirectional encoding and decoding is performed by the L transformer blocks to generate the target dialogue state of the current round of dialogue.

* * * * *